United States Patent [19]

Tomita et al.

[11] 3,952,458
[45] Apr. 27, 1976

[54] GRINDING MACHINE WITH FEED RATE CHANGING APPARATUS

[75] Inventors: Tamaki Tomita, Okazaki; Mineo Ishikawa, Kariya; Hayashi Kodama, Kariya; Kazuo Moriya, Kariya, all of Japan

[73] Assignee: Toyoda-Koki Kabushiki-Kaisha, Japan

[22] Filed: July 16, 1974

[21] Appl. No.: 488,998

[30] Foreign Application Priority Data
July 17, 1973   Japan............................ 48-81085

[52] U.S. Cl.......................... 51/165.77; 51/165.92; 51/267
[51] Int. Cl.² ........................................ B24B 49/08
[58] Field of Search........ 51/165 R, 165.77, 165.87, 51/165.88, 165.92, 267

[56] References Cited
UNITED STATES PATENTS

| | | | |
|---|---|---|---|
| 2,961,808 | 11/1960 | Dunigan........................... | 51/165.92 |
| 3,090,171 | 5/1963 | Stimson...................... | 51/165.92 UX |
| 3,172,240 | 3/1965 | Giardini...................... | 51/165.92 X |
| 3,524,285 | 8/1970 | Rutt ................... | 51/135 R |
| 3,550,327 | 12/1970 | Kusakabe.......................... | 51/165.92 |
| 3,589,077 | 6/1971 | Lenning............................ | 51/165.92 |

FOREIGN PATENTS OR APPLICATIONS

| | | | |
|---|---|---|---|
| 1,371,307 | 7/1963 | France........................... | 51/165.92 |
| 782,432 | 9/1957 | United Kingdom............. | 51/165.92 |

*Primary Examiner*—Harold D. Whitehead
*Attorney, Agent, or Firm*—Oblon, Fisher, Spivak, McClelland & Maier

[57] ABSTRACT

A grinding machine provided with an apparatus for changing a feed rate of a grinding wheel relative to a workpiece just before the grinding wheel comes into contact with the workpiece. An electrode device is mounted adjacent to the grinding wheel and connected to an electric power source for applying a potential to the surface of the grinding wheel. A detecting device detects a difference of potential between the grinding wheel and the workpiece to generate an output voltage. A memory device memorizes the output voltage detected when the grinding wheel is distant from the workpiece. A setting device reduces the memorized output voltage at a predetermined rate to provide a reference voltage corresponding to a predetermined gap between the grinding wheel and the workpiece. A comparator circuit compares the output voltage with the reference voltage to generate a feed rate changing signal when the output voltage attains the reference voltage. A control device controls a feed device so as to change the feed rate of a wheel slide in accordance with the feed rate changing signal.

4 Claims, 7 Drawing Figures

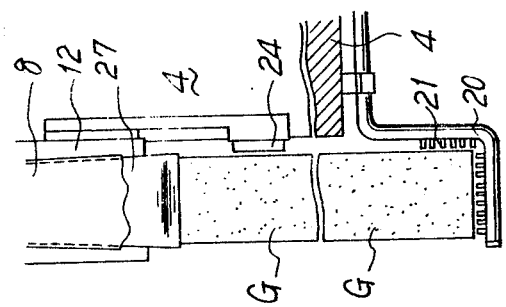
Fig.2
Fig.3
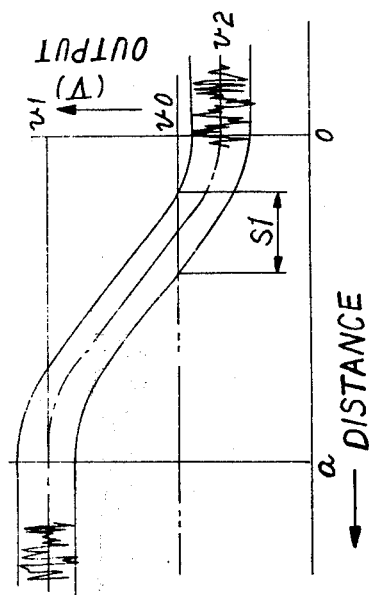
Fig.6
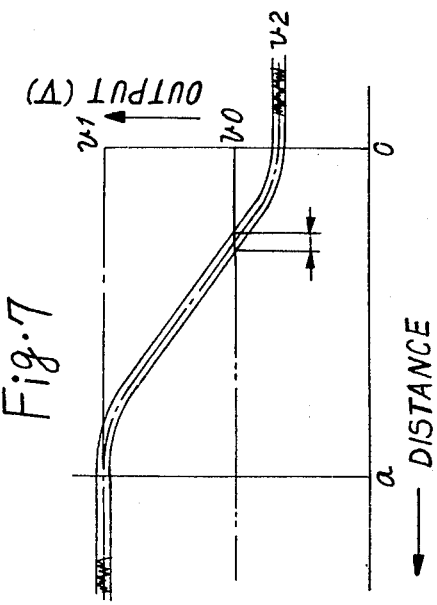
Fig.7

GRINDING MACHINE WITH FEED RATE CHANGING APPARATUS

BACKGROUND OF THE INVENTION

1. Field of the Invention

This invention relates generally to grinding apparatus, and more particularly to a grinding machine provided with an apparatus for changing a feed rate of a grinding wheel relative to a workpiece just before the grinding wheel comes into contact with the workpiece.

2. Description of the Prior Art

In the past, for the purpose of detecting the contacting of a grinding wheel with a workpiece, conventional feed rate-changing devices utilize a change of input current of a grinding wheel-driving motor caused by the contacting of the grinding wheel with the workpiece, a change of moment of the rotating grinding wheel, or a vibration or a noise caused by the contacting of the grinding wheel with the workpiece. While somewhat satisfactory, the feed rate changing devices using such detecting methods cannot, however, change the feed rate of the grinding wheel just before or at the moment of contact of the grinding wheel with the workpiece.

Another previous method for detecting the contacting of the grinding wheel with the workpiece utilizes a conductive circuit formed by the contact between a grinding machine and a conductive grinding wheel. Again, while somewhat satisfactory, this method suffers from the drawback that a non-conductive grinding wheel cannot be utilized.

SUMMARY OF THE INVENTION

It is, therefore, an object of the present invention to provide a grinding machine provided with new and improved apparatus for changing the feed rate of a grinding wheel just before the grinding wheel contacts the workpiece.

It is another object of the present invention to provide a grinding machine provided with new and improved apparatus wherein a difference of potential is generated between a grinding wheel and a workpiece and the change of the difference of potential caused by the approach of the grinding wheel to the workpiece is detected to thereby change the feed rate of the grinding wheel.

Still another object of the present invention is to provide a grinding machine provided with new and improved apparatus wherein the feed rate of a grinding wheel is changed from a rapid to a slow feed rate when the output voltage based on a difference of potential between a grinding wheel and a workpiece attains a reference voltage reduced at a predetermined rate with respect to the output voltage detected when the grinding wheel is distant from the workpiece, the reference voltage being set correspondingly to a predetermined gap between the grinding wheel and the workpiece.

According to the present invention these and other objects are achieved by a grinding machine which comprises a bed, a wheel slide slidably mounted on the bed, a grinding wheel rotatably mounted on the wheel slide, a work table for supporting a workpiece, a feed device for moving the wheel slide toward and away from the workpiece and other devices mentioned below. An electrode device is mounted adjacent to the grinding wheel and connected to an electric power source for applying a potential to the surface of the grinding wheel. A detecting device detects a difference of potential between the grinding wheel and the workpiece to generate an output voltage. A memory device memorizes the output voltage detected by the detecting device when the grinding wheel is distant from the workpiece. A setting device reduces the memorized output voltage at a predetermined rate to provide a reference voltage corresponding to a predetermined gap between the grinding wheel and the workpiece. A comparator circuit compares the output voltage with the reference voltage to generate a feed rate changing signal when the output voltage attains the reference voltage. A control device controls the feed device so as to change the feed rate of the wheel slide in accordance with the feed rate changing signal.

BRIEF DESCRIPTION OF THE DRAWINGS

The foregoing and other objects of the present invention will be more fully appreciated as the same becomes better understood from the following detailed description of a preferred embodiment when considered in connection with the accompanying drawings, in which:

FIG. 2 is a fragmentary view, seen along the arrow II of FIG. 1;

FIG. 3 is a fragmentary view taken along the line III—III of FIG. 1;

FIGS. 6 and 7 are graphs showing relationships between distance between a grinding wheel and a workpiece and output voltage.

DETAILED DESCRIPTION OF A PREFERRED EMBODIMENT

Figure 1:
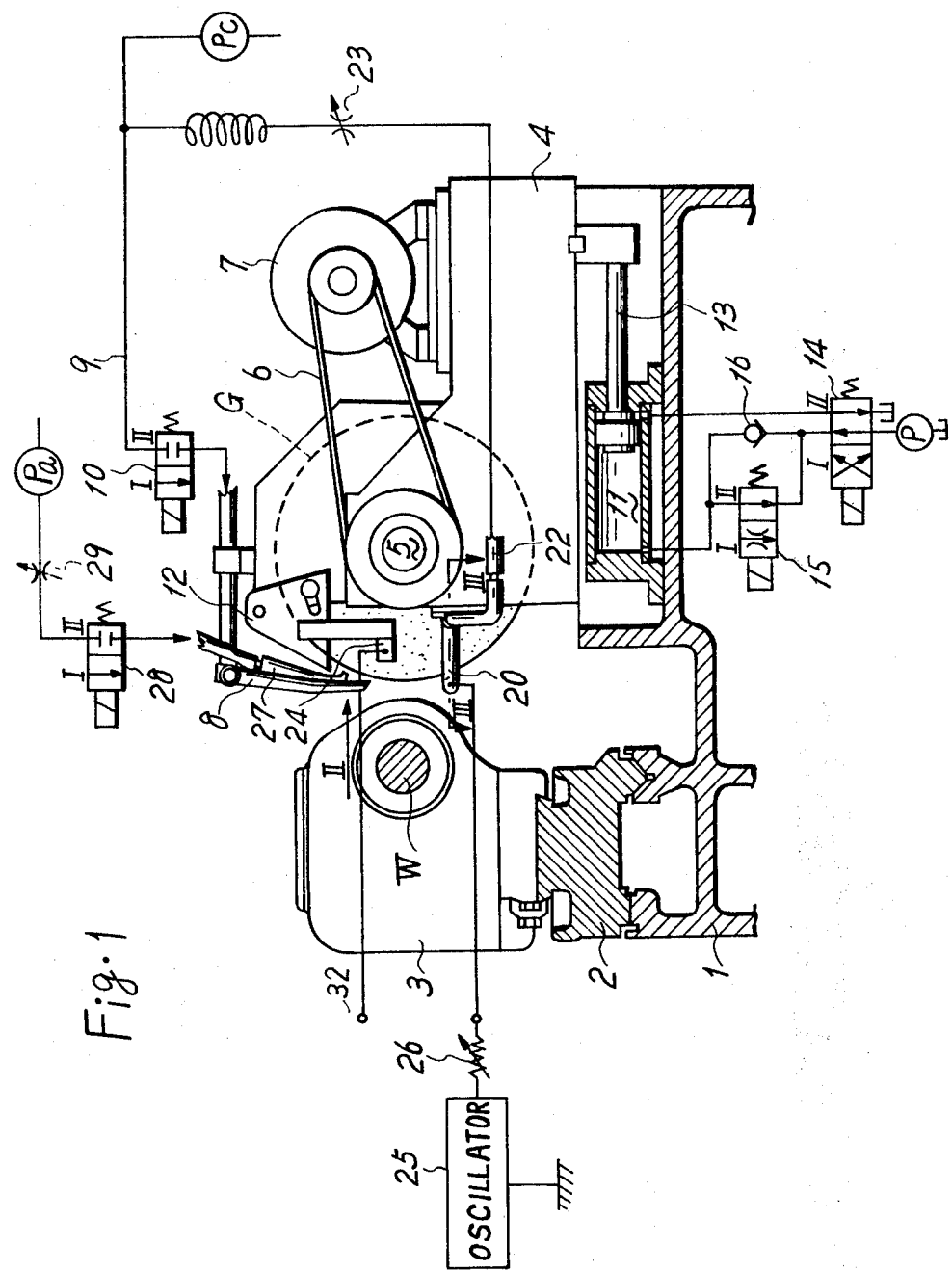
FIG. 1 is a schematic view showing a preferred embodiment according to the present invention.

Referring now to the drawings wherein like reference numerals refer to or designate identical or corresponding parts throughout the several views and more particularly to FIG. 1 thereof wherein is shown a work table 2, which is slidably mounted on a bed 1 which fixedly mounts a head stock 3 and a tail stock (not shown) for rotatably supporting a workpiece W therebetween. A wheel slide 4 is slidably mounted on the bed 1 so as to be moved toward and away from the supported workpiece W. The above-mentioned grinding machine parts are made of conductive material. A grinding wheel G is fixed to a wheel shaft 5, made of conductive material, and is in non-conductive relationship with the wheel shaft 5. The wheel shaft 5 is rotatably mounted on the wheel slide 4 and is drivingly connected to a drive motor 7 through a belt 6. In the case wherein a nonconductive grinding wheel such as, for example, a vitrified grinding wheel is mounted on the wheel shaft 5, it is not necessary to interpose an isolating or insulating material between the grinding wheel G and the bed 1 or the wheel shaft 5.

A coolant nozzle 8 is secured on the top of a grinding wheel guard 12 for discharging a coolant downwardly to the grinding point or contacting position of the grinding wheel G and the workpiece W during a grinding operation. A pump Pc is connected to the coolant nozzle 8 by means of a conduit 9 for supplying the coolant from a coolant reservoir (not shown) to the coolant nozzle 8. A magnetic change-over valve 10 is connected between the coolant nozzle 8 and the pump Pc for opening and closing the conduit 9.

A feed cylinder 11 is mounted on the bed 1 for slidably receiving a piston, a piston rod 13 of which is connected to the lower portion of the wheel slide 4. Fluid under pressure is applied to and is discharged from the cylinder 11 through a magnetic change-over valve 14 for changing the advance and the retraction of the wheel slide 4. Another change-over valve 15 is used for changing the feed rate of the wheel slide 4. A check valve 16 is connected between the cylinder 11 and the change-over valve 14 in parallel with the change-over valve 15 for permitting the wheel slide 4 to rapidly retract.

Hereunder is described a feed rate changing device which changes a feed rate of the wheel slide 4 or the grinding wheel G relative to the workpiece W just before the grinding wheel G contacts the workpiece W or when the grinding wheel G just contacts the workpiece W.

A conductive pipe 20 is fixed to the wheel slide 4 with electrically isolated relationship to the same, for supplying a conductive coolant to the periphery of the grinding wheel G to thereby wet the same. The conductive pipe 20, the end of which is closed, extends along the periphery of the grinding wheel G and has a plurality of very small nozzles 21 thereon opposed to the peripheral surface of the grinding wheel G, as shown in FIG. 3. The conductive pipe 20 serves also as an electrode to provide an electric potential on the periphery of the grinding wheel G. The conductive pipe 20 is connected to the conduit 9 through a relatively long nonconductive pipe 22 for preventing the current applied thereto from leaking by the conductive coolant and in turn is connected to the pump Pc. A variable throttle 23 is interposed between the conductive pipe 20 and the conduit 9 for adjusting the quantity of coolant applied to the grinding wheel G so that an appropriate coolant film may be formed on the periphery of the grinding wheel G and the vicinity of the wheel shaft 5 may not be wet.

A carrier oscillator 25 serving as a power source is connected at one output terminal thereof to the bed 1 and at the other output terminal to the conductive pipe 20 through a variable resistance 26 for providing a carrier current to the conductive pipe 20.

An electrode 24 is mounted on the grinding wheel guard 12 in an electrically isolated relationship with the same so as to be opposed to the side surface of the grinding wheel G with a predetermined clearance, as shown in FIG. 2. The electrode 24 is connected to an electric circuit, described hereinafter with reference to FIG. 4, which detects the change of difference of potential between the electrode 24 and the conductive pipe 20 due to the approach of the grinding wheel G to the workpiece W.

An air nozzle 27 is fixed to the rear side of the coolant nozzle 8 and the air-blowing opening thereof is opposed to the entire width of the outer peripheral edge of the grinding wheel G. The air nozzle 27 is connected to an air pump Pa operable as a compressed air-supplying source through a magnetic change-over valve 28 and a variable throttle 29.

Figure 4:
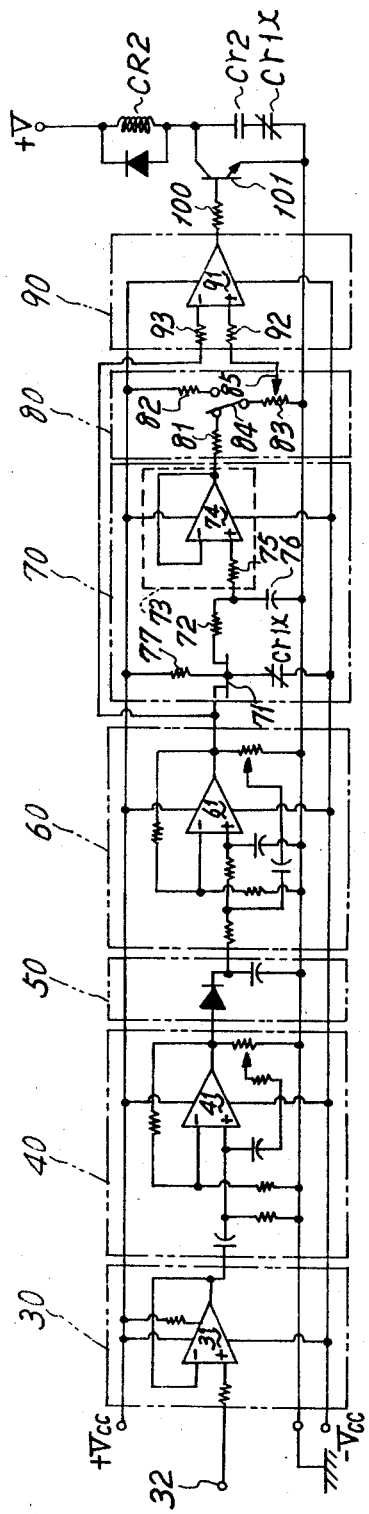
FIG. 4 is an electric circuit diagram.

In FIG. 4, an amplifier 30 employing a differential amplifier 31 therein is connected at its input terminal 32 to the electrode 24 for amplifying the input voltage applied thereto. The output terminal of the amplifier 30 is connected to a high-pass filter circuit 40 using a differential amplifier 41 which eliminates oscillations with low frequencies, as well known to those skilled in the art. In the present embodiment, the high-pass filter circuit 40 is set and adjusted so as to permit carrier voltage oscillations to pass therethrough, but so as to eliminate voltage fluctuations with low frequencies which are caused by drifts of electric circuit components and the fluctuation of a commercial frequency (50/60 hertz) of a power service. For example, in case the frequency of the carrier current is 10 kilohertz, the high-pass filter circuit 40 is set and adjusted to eliminate oscillations less than 1 kilohertz.

A rectifier circuit 50 is connected to the output terminal of the high-pass filter circuit 40 for rectifying and demodulating the carrier current transmitted from the same. The output terminal of the rectifier circuit 50 is connected to a low-pass filter circuit 60 which eliminates a high frequency oscillation as well known to those skilled in the art. In the present embodiment, the low-pass filter circuit 60 is set to eliminate voltage fluctuations caused by the rotation of the grinding wheel G. For example, in case the rotation number of the grinding wheel G is 28 r.p.s., the low-pass filter circuit 60 is set and adjusted so as to eliminate oscillations of more than 10 hertz.

The output terminal of the low-pass filter circuit 60 is connected to a memory circuit 70 wherein an analogue switch 71, a resistance 72 and a buffer amplifier 73 are connected in series between the input and the output terminals thereof. Condenser 76 is connected to the resistance 72 and the buffer amplifier 73 at one end thereof and is grounded at its other end for memorizing an input voltage, applied to its input terminal, in accordance with an external command signal applied to the analogue switch 71.

The buffer amplifier 73 includes a differential amplifier 74 therein, the positive input terminal of which is connected to the condenser 76 through a resistance 75. The output terminal of the differential amplifier 74 constitutes the output terminal of the memory circuit 70 and is connected at its negative input terminal to receive a negative feed back. Thus, the input impedance of the differential amplifier 74 is raised very high to thereby cause the charged voltage to be accurately maintained in the condenser 76.

The gate terminal of the analogue switch 71 is connected to a constant voltage source +Vcc through a resistance 77 and also to the constant voltage source −Vcc through a normally closed contact Cr1x of a retraction end-confirming relay, which is energized only when the wheel slide 4 is in the retracted position thereof, for controlling the conduction and nonconduction of the analogue switch 71.

A setting circuit 80 is connected to the output terminal of the memory circuit 70 for reducing at a predetermined rate the memorized voltage, which is detected when the grinding wheel G is distant from the workpiece W, to provide a reference voltage set to correspond to a predetermined gap between the grinding wheel and the workpiece W. A resistance 81 is connected at one end thereof to the input terminal of the setting circuit 80. A resistance 82 is connected at one end thereof to the constant voltage source +Vcc. A variable resistance 83 having one end connected to ground is provided for adjustably setting the reducing ratio. The other end of the variable resistance 83 is adapted to be selectively connected by a switching element 84 to the other ends of the resistances 81 and 82. A tap 85, the position of which is able to be changed along the resistance 83 and to be fixed at any point, constitutes the output terminal of the setting circuit 80.

A comparator circuit 90 is operable as a voltage comparator employing a differential amplifier 91 which is connected at its positive input terminal to the output terminal of the setting circuit 80 through a resistance 92 and at its negative input terminal thereof to the output terminal of the low-pass filter circuit 60 through a resistance 93. The output terminal of the differential amplifier 91 constitutes the output terminal of the comparator circuit 90. Thus, the comparator circuit 90 serves to generate a feed rate changing signal when the output voltage of the low pass filter circuit 60 is less than the reference voltage.

The output terminal of the comparator circuit 90 is connected to the base terminal of a switching transistor 101 through a resistance 100. The switching transistor 101 is connected at its collector terminal to a constant voltage source +V through a relay CR2 for changing the feed rate of the wheel slide 4 and is grounded at its emitter terminal. The collector terminal is grounded by a normally opened contact Cr2 for providing self-holding and a normally closed contact Cr1x of the retraction end-confirming relay.

When the relay CR2 is energized, a relay circuit (not shown) is adapted to change the magnetic change-over valve 15 to its port 1, to change the magnetic change-over valve 10 to its port 1 and to change the magnetic change-over valve 28 to its port II.

The operation of the aforementioned preferred embodiment will be described hereunder.

FIG. 1 shows a state before a grinding operation in which the wheel slide 4 and the other accompanying parts are in their initial positions or states. When an operation-starting signal is applied to the relay circuit, the drive motor 7 is operated to rotate the grinding wheel G counterclockwisely in FIG. 1 and the pump Pc is driven to supply the coolant to the pipe 20 through the variable throttle 23. The variable throttle 23 is adjusted so that the coolant may continuously reach the grinding wheel and wet only the peripheral portion of the grinding wheel G in cooperation with a centrifugal force caused by the rotation of the grinding wheel G. In addition, pumps P and Pa are driven to supply operational pressure fluid and compressed air, respectively.

When a grinding cycle-starting signal is applied to the relay circuit, the magnetic change-over valve 28 is changed to its port I to thereby permit the compressed air to be applied to the periphery of the grinding wheel G. The compressed air applied to the periphery of the grinding wheel G serves to prevent the coolant discharged from the very small nozzles 21 from scattering toward the workpiece W. Furthermore, the discharged air operates to keep the thickness of the coolant film formed on and encircling the periphery of the grinding wheel G constant.

The carrier oscillator 25 is then operated to transmit the carrier, for example, having a 10 kilohertz frequency and 30 volts in peak-to-peak voltage. This voltage is applied to the conductive pipe 20 through the variable resistance 26 and in turn to the electrode 24 which performs a condensing operation in cooperation with the wet periphery of the grinding wheel G. The potential detected by the electrode 24 is inputed to the amplifier 30. In this case, although the conductive pipe 20 is connected to ground through the conductive coolant flowing in the nonconductive pipe 22 to the coolant reservoir, the leakage of current due to the conductivity of the coolant is prevented by a large resistance constituted by the relatively long nonconductive pipe 22 and a high resistivity of the coolant.

The voltage applied to the amplifier 30 is amplified and in turn inputed to the high-pass filter circuit 40 wherein voltage oscillations having low frequencies less than 1 kilohertz are eliminated. The output voltage of the high-pass filter circuit 40 is inputed to the rectifier circuit 50 to be rectified and is then in turn inputed to the low-pass filter circuit 60 wherein voltage fluctuations having high frequencies more than 10 hertz are eliminated.

A relationship between the output voltage V of the low-pass filter 60 and a distance S between the grinding wheel G and the workpiece W is shown in FIG. 7, wherein the output voltage V is v1 when the distance S is larger than a distance $a$ and the output voltage V decreases as the grinding wheel G approaches the workpiece W within the distance $a$. The output voltage V is constantly v2 when the distance S is zero or when the grinding wheel G contacts the workpiece W.

An experimental data of the present invention is as follows; wherein the distance $a = 0.3$ milli-meters $v1 = 2$ volts and $v2 = 0.7$ volts and, wherein v1 designates a pick-up voltage and v2 designates ground voltage.

The output voltage of the low-pass filter 60 is inputed to the negative input terminal of the differential amplifier 91 and to the memory circuit 70. Then, since the wheel slide 4 is in its retracted position, the retraction confirming relay is kept energized to thereby open the normally closed contact Cr1x. Thus, the analogue switch 71 is in a conductive state due to the application of a positive voltage to its gate terminal. The mean output voltage V1 is transmitted from the memory circuit 70 to the setting circuit 80. When the switching element 84 of the setting circuit 80 is connected to the resistance 81, a voltage kv1 ($k$; contant less than 1) which is obtained by decreasing the voltage v1 at a predetermined rate by the variable resistance 83 is outputed as the reference voltage v0. When the switching element 84 is connected to the resistance 82, a constant voltage vc (lower than the voltage v1), which is given by reducing and setting the voltage of the constant voltage source +Vcc by the resistance 82 and the variable resistance 83, is outputed as the reference voltage v0. The voltage input from the low-pass filter circuit 60 is compared with the reference voltage v 0 applied to the positive input terminal of the comparator circuit 90.

The peripheral portion of the grinding wheel G is fully wet by the coolant supplied from the conductive pipe 20 after the grinding cycle-starting signal is applied to the relay circuit. Then, the magnetic change-over valve 14 is changed to its port I to thereby advance the wheel slide 4 at the rapid feed rate. When the wheel slide 4 is moved away from its retracted position, the retraction end-confirming relay is deenergized to thereby close the normally closed contact Cr1x. The analogue switch 71 of the memory circuit 70 turns to a nonconductive state and the condenser 76 memorizes the pick-up voltage v1, so that the pick-up voltage v1 appears at the output terminal of the memory circuit 70.

As the wheel slide 4 approaches within the distance $a$, the output voltage decreases, but the output voltage v1 of the memory circuit 70 does not change. When the output voltage of the low-pass filter circuit 60 becomes lower than the reference voltage v0, the feed rate-changing signal is transmitted from the comparator circuit 90 to thereby turn the transistor 101 to the conductive state. Thus, the feed rate-changing relay CR2 is energized.

The magnetic change-over valve 28 is then deenergized to be changed to its port II, thus stopping the supply of compressed air from the air nozzle 27. The change-over valve 10 is changed to its port 1 for permitting the coolant nozzle 8 to supply a lot of coolant for a grinding operation to the periphery of the grinding wheel G. Furthermore, the magnetic change-over valve 15 is changed to its port 1 for permitting the wheel slide 4 to advance at the grinding or slow feed rate to grind the workpiece W.

When the workpiece W is ground to a predetermined shape and size, a wheel slide-retracting signal is generated to change the magnetic change-over valve 14 to its port II to thereby rapidly move the wheel slide 4 away from the workpiece W. The magnetic change-over valve 10 is changed to its port II, the magnetic change-over valve 28 is changed to its port I and the magnetic change-over valve 15 is changed to its port II. The wheel slide 4 attains its retracted end to thereby energize the retraction end-confirming relay. Thus, the grinding operation is completed.

Figure 5:
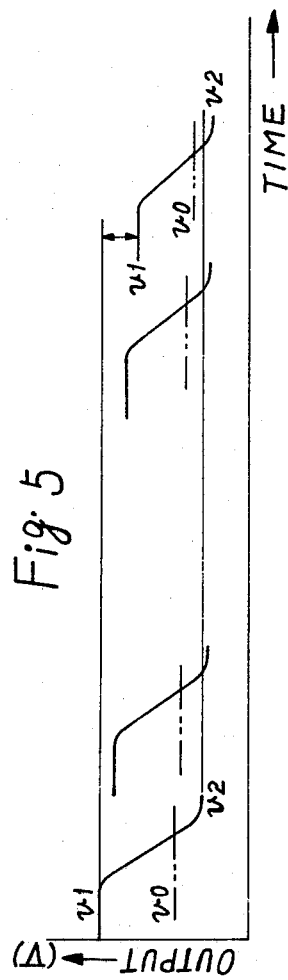
FIG. 5 is a graph showing a relationship between time and output voltage.

When the aforementioned grinding cycle is repeated, the pick-up voltage v1 decreases in each grinding cycle of the first few cycles and thereafter comes to a stable state, as shown in FIG. 5. Experimental data obtained in the case wherein the grinding cycles were started from a state wherein the grinding wheel G was dry were as follows: In the first cycle the pick-up voltage v1 was 2 volts and in the sixth cycle the v1 was 1 volt. The distance $a$, where the voltage v1 begins to decrease was constantly 0.3 millimeters in each grinding cycle. The ground voltage v2 generated when the grinding wheel G contacts the workpiece W was 0.7 volts in the first grinding cycle and thereafter decreased in each grinding cycle. After the sixth grinding cycle the ground voltage v2 was approximately 0.5 volts with a slight change. It can be surmised that these phenomena were caused by the change of the wet state of the grinding wheel G in the first few grinding cycles, wherein a lot of coolant was applied to the grinding wheel G in each grinding cycle.

Accordingly, when the grinding wheel G is within the distance $a$ relative to the workpiece W, the output voltage of the low-pass filter circuit 60 changes approximately in proportion with the change of the pick-up voltage v1.

When the switching element 84 is connected to the resistance 82, the reference voltage v0 transmitted from the setting circuit 80 to the positive input terminal of the differential amplifier 91 is held constant in all grinding cycles. Therefore, the space formed between the grinding wheel G and the workpiece W where the feed rate of the wheel slide 4 is changed from the rapid feed rate to the grinding feed rate changes and increases in the first few grinding cycles.

When the switching element 84 is connected to the resistance 81, the reference voltage v0 turns to the value kv1 proportional to the pick-up voltage v1 in each grinding cycle, so that the space between the grinding wheel G and the workpiece W is approximately constant in all grinding cycles.

The output voltage of the rectifier circuit 50 is shown by the graph in FIG. 6, in a similar manner as shown with FIG. 7. As shown by the graph, the output voltage oscillates with a very large amplitude. If the feed rate of the wheel slide 4 is changed with reference to the output voltage, the range S1 between the positions where the output voltage intersects with the reference voltage v0 is wide, so that the position where the feed rate of the grinding wheel G is changed is large in range. It can be surmised that the fluctuation of the output voltage is caused by the minute ununiformness of the coolant film encircling the periphery of the grinding wheel G because the frequency of the voltage fluctuation accords with the rotation of the grinding wheel G.

Experimental data with respect to the gap between the grinding wheel G and the workpiece W in the case wherein the switching element 84 was connected to either the resistance 82 or 81 in the same condition was as follows; The switching element 84 was connected to the resistance 82, the gap was 15 microns in the first grinding cycle and thereafter increased in each grinding cycle and in and after the fourth grinding cycle the gap was 50 microns; and the switching element 84 was connected to the resistance 81 and the gap was approximately constant 15 microns throughout all grinding cycles.

As understood by the aforementioned, in the present invention the contact and the approach of the grinding wheel G with the workpiece W are detected in accordance with the electrical change so that the relative feed rate between the grinding wheel G and the workpiece W may be changed just before the grinding wheel G contacts the workpiece W. When the present embodiment is used as a gap eliminator, an unoperative time is reduced to a minimum and the grinding wheel G is prevented from colliding with the workpiece.

Furthermore, the gap between the grinding wheel G and the workpiece W is accurately detected because the relative feed rate between the grinding wheel G and the workpiece W is changed when the electric output value on the periphery of the grinding wheel G becomes smaller at a predetermined rate than that detected when the grinding wheel G is away from the workpiece W.

Obviously, numerous modifications and variations of the present invention are possible in light of the above teachings. It is to be understood therefore that within the scope of the appended claims the invention may be practiced otherwise than as specifically described herein.

We claim:

1. A grinding machine comprising:
   a bed;
   a wheel slide slidably mounted on said bed;
   a grinding wheel rotatably mounted on said wheel slide;
   a work table for supporting a workpiece;
   feed means for moving said wheel slide toward and away from said workpiece;
   an electric power source;
   electrode means mounted adjacent to said grinding wheel and connected to said electric power source for applying a potential to the surface of said grinding wheel;

coolant means for connecting said electrode means and said grinding wheel so as to charge said grinding wheel by creating a conductive coolant film thereon;

detecting means for detecting a difference of potential between said grinding wheel and said workpiece to generate an output voltage proportional thereto at every grinding operation, said difference of potential being changeable due to the application of coolant to said grinding wheel;

memory means for memorizing the output voltage detected by said detecting means before said coolant film on said grinding wheel is engaged with said workpiece;

setting means for reducing the memorized output voltage at a predetermined rate to provide a reference voltage corresponding to a predetermined constant gap between said grinding wheel and the workpiece;

comparator circuit means for comparing the output voltage with the reference voltage to generate a feed rate changing signal when said output voltage attains said reference voltage; and control means for controlling said feed means so as to change the feed rate of said wheel slide in accordance with said feed rate changing signal.

2. A grinding machine according to claim 1, wherein said electrode means has a coolant nozzle of said coolant means for wetting said grinding wheel with a conductive coolant.

3. A grinding machine according to claim 1, wherein said electric power source is a carrier oscillator.

4. A grinding machine according to claim 3, wherein said detecting means comprises:

an amplifier connected to said electrode means for amplifying said difference of potential;

a high-pass filter circuit connected to said amplifier for eliminating an oscialltion having a low frequency;

a rectifier circuit for rectifying the output signal of said high-pass filter circuit; and a low pass filter circuit for eliminating an oscillation having a high frequency in the rectified output signal of said rectifier circuit.

* * * * *